United States Patent [19]
Rutishauser

[11] Patent Number: 5,583,611
[45] Date of Patent: Dec. 10, 1996

[54] SCANNER WHICH CAN BE CONVERTED FOR AUTOMATIC DOCUMENT INTAKE

[75] Inventor: Thomas Rutishauser, Uerikon, Switzerland

[73] Assignee: Rutishauser Data AG, Stafa/Schweiz, Switzerland

[21] Appl. No.: 440,185

[22] Filed: May 12, 1995

[30] Foreign Application Priority Data

Jun. 28, 1994 [CH] Switzerland .................... 02 054/94

[51] Int. Cl.[6] ................... G03B 27/62; G03G 21/00
[52] U.S. Cl. ............................... 355/75; 355/231
[58] Field of Search .................... 355/75, 230, 231; 358/498

[56] References Cited

U.S. PATENT DOCUMENTS

| | | | |
|---|---|---|---|
| 2,927,503 | 3/1960 | Zollinger | 355/75 |
| 3,623,806 | 11/1971 | Short | 355/14 |
| 4,157,222 | 6/1979 | Ishihara | 355/75 |
| 4,386,847 | 6/1983 | Torto et al. | 355/75 |
| 4,466,736 | 8/1984 | Masaki | 355/75 |
| 4,636,065 | 1/1987 | Kanemitsu et al. | 355/75 |
| 5,033,728 | 7/1991 | Miura et al. | 271/3 |
| 5,077,614 | 12/1991 | Stemmle et al. | 358/296 |
| 5,327,205 | 7/1994 | Baba | 355/311 |
| 5,470,051 | 11/1995 | Morigami et al. | 271/7 |

*Primary Examiner*—Arthur T. Grimley
*Assistant Examiner*—David A. Lane
*Attorney, Agent, or Firm*—Cushman, Darby & Cushman

[57] ABSTRACT

A description is given of a scanner (2) which is intended for manual document input and can be converted for automatic document intake, having a cover unit (30) which comprises a cover (38), a folding part (36) and a retaining part (34) which is connected releasably to the scanner housing (4). The folding part connects the cover to the retaining part in a link-like manner via parallel hinges (40) fitted on both sides of the folding part. The folding part, furthermore, exhibits an elongate through-passage (44) which extends over the operating width and runs parallel to the hinges.

8 Claims, 4 Drawing Sheets

SCANNER WHICH CAN BE CONVERTED FOR AUTOMATIC DOCUMENT INTAKE

The invention relates to a scanner as claimed in claim 1.

In the case of known scanners of this type, in the event of the user converting the scanner, the cover unit is removed from the scanner housing and replaced in its entirety by a casing which contains the feeding apparatus for the automatic document intake. In comparison with the casing space required for the feeding apparatus, the outer dimensions of the casing are relatively large. In actual fact, these dimensions also correspond, in terms of length, approximately to those of the scanner housing, in order to cover over the transparent document-reading surface to the full extent. If the scanner is converted, by the installation of the casing, to automatic document intake, then the cover unit is superfluous and has to be dispensed with.

The object of the invention is to provide a solution which simplifies the conversion of the scanner to automatic document intake and can be configured in a cost-effective manner.

The solution is achieved by the features of claim 1.

By virtue of the configuration of the cover unit and the provision of the discharge opening for documents, it is possible to put the original cover unit to further use even after the scanner has been converted. The dimensions of the intake apparatus are restricted to the space required for accommodating the moving parts. This is important, in particular, for the storage and transportation of the feeding apparatus. Furthermore, if the feeding apparatus is of a scroller-type design, it may be constructed without a complete housing of its own. The still-used original cover unit can then form the missing housing part for the feeding apparatus by way of its retaining part and folding part. This results, overall, in savings in material and production costs.

In accordance with an advantageous further development of the invention, restraining means are provided on the cover unit, in the region of the through-passage, which restraining means prevent the unintentional repeated intake of documents which have already been read in and transported to the deposition location, and also ensure that said documents are deposited in an ordered manner.

In accordance with a preferred configuration of the invention, the through-passage is to be configured such that it can also serve as an inlet opening for documents to the feeding apparatus and, in this arrangement, can assume the task of positioning the feeding shaft.

Advantageously, in the case of the scanner according to the invention, the feeding apparatus is fastened on the scanner housing by the same means which have served beforehand for the fastening of the cover unit, and the means suitable for the fastening of the cover unit are provided, in turn, on the intake apparatus.

In accordance with a preferred configuration of the scanner according to the invention, there is provided, in a manner laterally offset with respect to a document stop assigned to the transparent underlying surface, and on the far side of said stop a strip-like reading window which is arranged above the parking position of the read-in head.

The invention is explained hereinbelow using two exemplary embodiments of a scanner and with reference to the drawing, in which.

Figure 1:
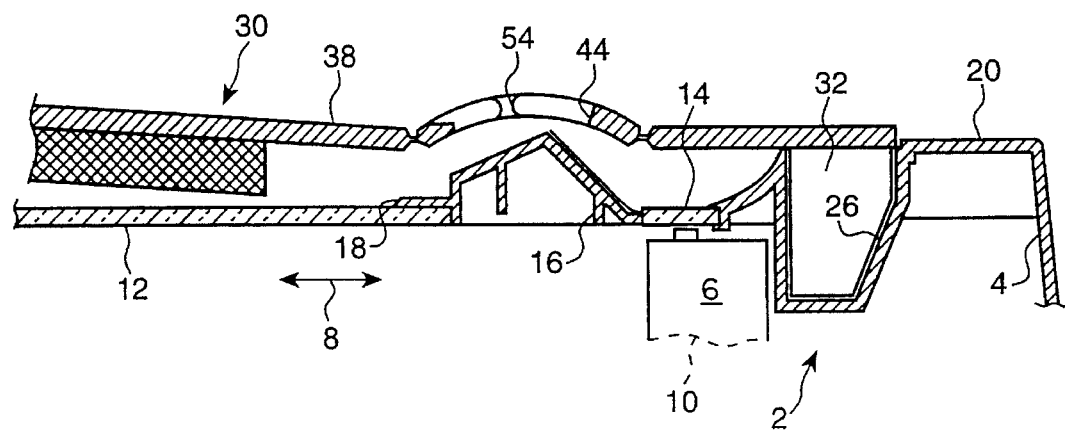
FIG. 1 shows schematically, a vertical section of a flat-bed scanner corresponding to the first exemplary embodiment, with the cover tilted up.

In FIG. 1, 2 shown is the general designation for a flat-bed scanner which exhibits a housing 4 which is rectangular in plan view. The housing 4 contains a read-in head 6 which can be displaced on a horizontal path 8, indicated by a double arrow, and can assume a parking position 10. The length of the web 8 is dependent on a maximum document size and/or document length which is predetermined for the design of the scanner. Above the path 8, the housing 4 is delimited by a horizontal document rest 12 which is formed by a plate of transparent material, e.g. a glass plate. At the same level as the document rest 12, but laterally offset with respect to same, the housing 4 exhibits a reading window 14, which likewise consists of a transparent material. The reading window 14 is located above the parking position 10. A housing part 16 adjoins the document rest 12 with a document stop 18, contains the reading window 14 and forms the lateral termination of the housing 4. On its upper side 20, the housing part 16 exhibits directing surfaces 22 and 24, which are on both sides of the reading window 14 and are important for the operation of automatic document feeding, which mode of operation is to be explained hereinbelow. Furthermore, the housing part 16 exhibits two slit-like fastening openings 26 (only one is shown) into which there is releasably plugged in each case one plug-in protrusion 32 of a cover unit which has the general designation 30.

Figure 2:
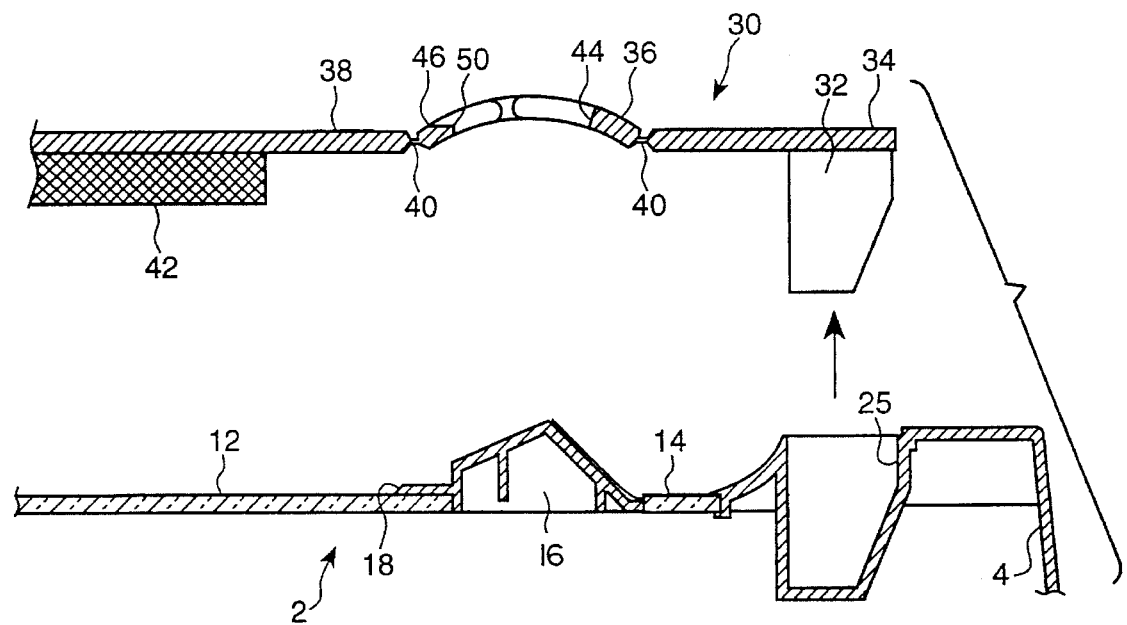
FIG. 2 shows the scanner according to FIG. 1 with the cover unit lifted off.

The cover unit 30 (FIG. 2) comprises a retaining part 34, which bears the plug-in protrusion 32, folding part 36 and a cover 38. The folding part 36 is connected to the retaining part 34 and the cover 38 in each case via a film hinge 40 which has hinge pins running in parallel to one another. The lid 38 is provided, on its underside, with a press-on pad 42, by means of which said cover bears, in its horizontal, normal closed position, on the document rest 12 or on a document resting against the stop 18. In FIG. 1, the cover 38 is represented in a state in which it has been raised slightly from said closed position. With said configuration of the cover unit, it is however, also possible, in the event of a relatively thick document, e.g. a book, being located on the document rest 12 and resting against the stop 18, to bring the cover, for the reading-in of pages from said book, into a closed position in which the folding part 36 is correspondingly angled off.

According to the invention, an elongate through-passage 44 is, then, provided in the folding part 36, said through-passage extending parallel to the folding axes and its length being adapted to the maximum document width. Said through-passage 44, of which the generally rectangular form can be seen in FIG. 4, permits the through-passage of documents in conjunction with the automatic feeding of the same. Extending from the lower edge 46 of the through-passage 44 is a strip-like stop 50 which projects into said through-passage and forms a restraining means for documents. The stop 50 exhibits two interruptions 52. The side edges 48 of the through-passage 44 are interrupted, at the same distance from the lower edge 46, by in each case one groove 54. The function of the stop 50 with the interruptions 52, as well as that of the grooves 54, is explained below.

Figure 3:
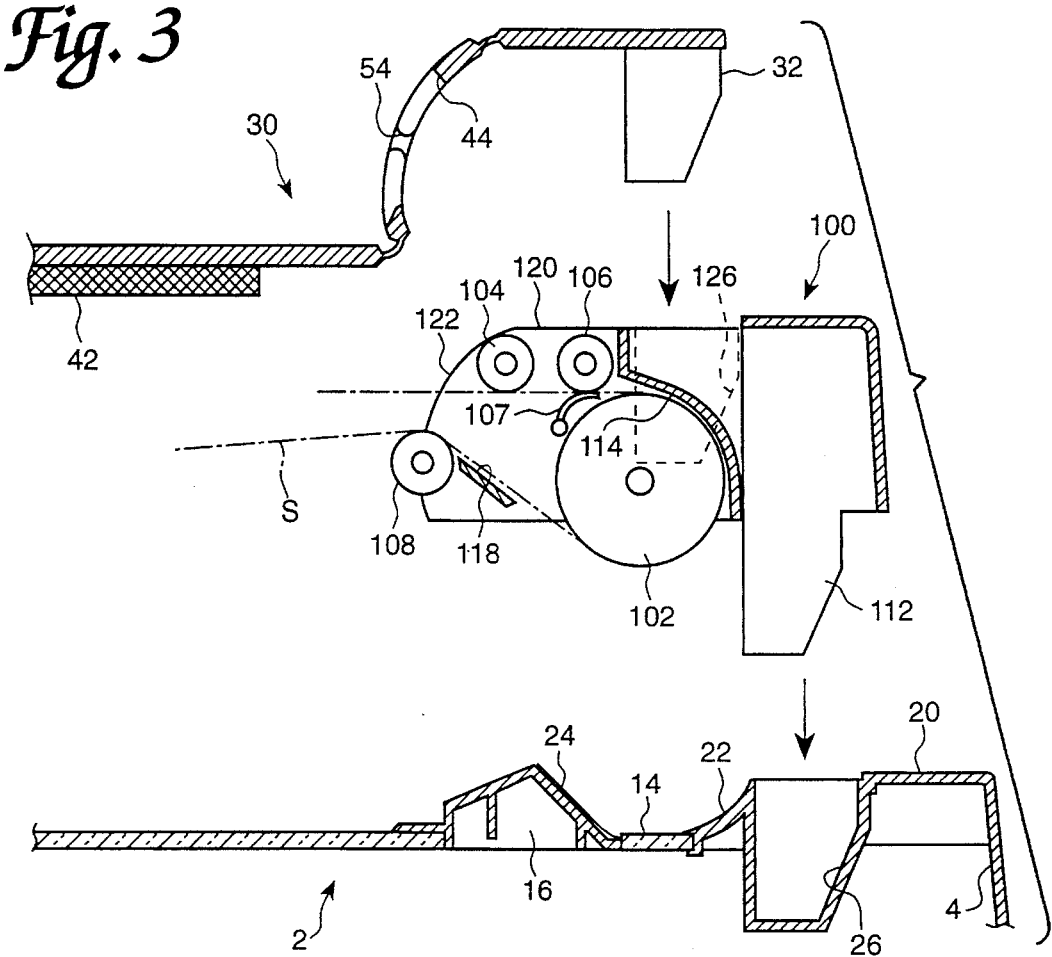
FIG. 3 shows an exploded representation of the scanner according to FIG. 1 with the cover unit and an example of a feeding apparatus.
Figure 5:
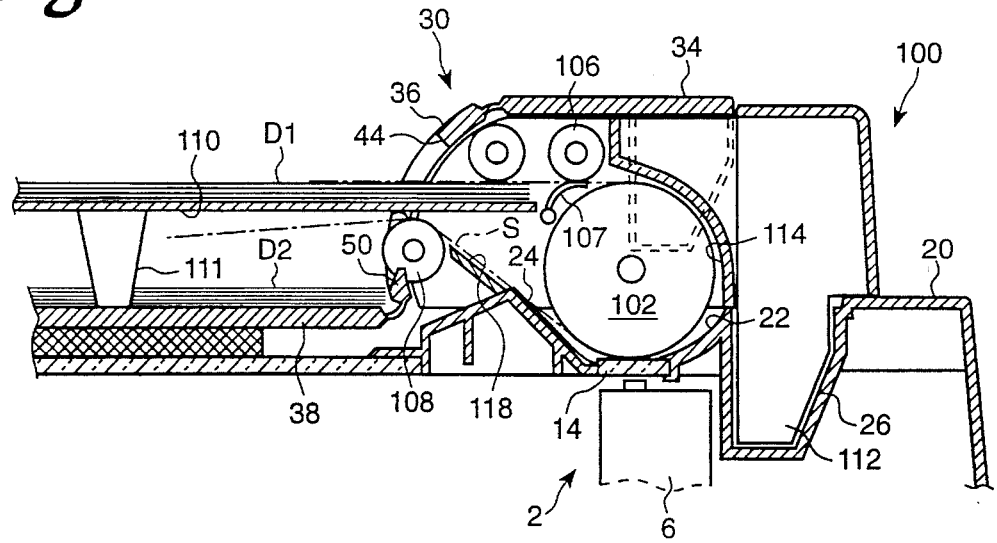
FIG. 5 shows the scanner according to FIG. 1 which has been converted by installing the feeding apparatus according to FIG. 3.
Figure 4:
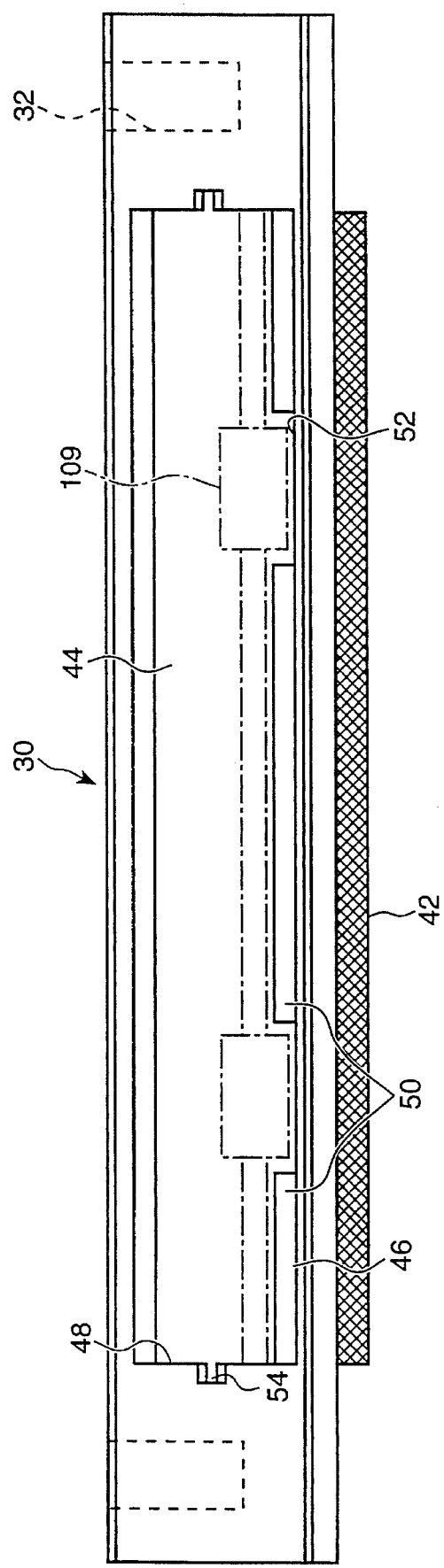
FIG. 4 shows a front view of the cover unit in the representation according to FIG. 3.

The form and position of the cover unit 30 in conjunction with the converted scanner can be seen in FIGS. 3, 4 and 5. As, however, can already be seen in FIG. 2, the cover unit 30 may be lifted off from the scanner housing 4 by the user, in that the plug-in protrusions 32 are moved out of the fastening openings 26. The feeding apparatus which has the general designation 100 is then fitted over the housing part 16. If the plug-in protrusions 112 provided on said feeding apparatus are introduced into the fastening openings 26 (see FIG. 5), the feeding apparatus is aligned with respect to the scanner housing 4 and all the parts of the feeding apparatus 100 which are necessary for direct interaction with the scanner are located in the operating position. In particular, a reading roller 102 provided on said feeding apparatus is arranged above the reading window 14 of the scanner. Furthermore, a document guide 114 which partially encloses the reading roller 102 is positioned such that it is located opposite the directing surface 22, and a deflection molding 118 is positioned to be approximately in extension of the directing surface 24. Provided on the upper side 120 of the feeding apparatus 100 are fastening openings 126 which, in terms of form and spacing, correspond to the fastening openings 26 on the scanner housing 4. The fastening means formed from the fastening openings 126 and the plug-in protrusions 112 thus make it possible for the cover unit 30 to be fastened on the feeding apparatus 100. The position of the fastening openings 126 is selected such that the feeding apparatus 100 is encased, on its flat upper side 120, by the retaining part 34 and, on its curved end side 122, by the folding part 36 (FIG. 5). The cover 38 then bears on the document rest 12 in an approximately horizontal position and covers over said document rest 12.

The feeding apparatus 100 is generally of the conventional construction and, in addition to the rotatably mounted reading roller 102, it contains, as laterally rotatably mounted parts, a drawing-off roller 104, a separation roller 106 and a transportation roller 108. Said parts are in operative connection, in a known manner, with a rotary drive (not shown). A feeding shaft 110, which likewise belongs to the feeding apparatus, can be pushed in through the through-passage 44 in the folding part 36 such that the shaft runs beneath the drawing-off roller 104. The feeding shaft 110, which can receive a document stack designated by D1, is supported, at one end, in the grooves 54 and is retained such that it is laterally positioned by said grooves. At the other end, said shaft is supported on the cover 38 via two feet 111, on both sides of the document stack D2. Interacting with the separation roller 106 is a flexible stripper lug 107 of a separation device. The latter acts in a known manner in order to avoid the simultaneous intake of more than one document from the stack D1. The jointly driven sections 109, which can be seen in FIG. 4 and belong to the transportation roller 108 which is represented by chain-dotted lines in said figure, are aligned with respect to the interruptions 52 such that the stop 50 penetrates between said sections.

S designates, in FIGS. 3 and 5, the path, indicated by chain-dotted lines, along which the automatic document feeding takes place, this running from the feeding shaft 110 to the deposition location on the cover 38. The path S of a document runs on the circumference of the reading roller 102, via the reading window 14, then along the directing surface 24, the deflection molding 118 and, finally, beneath the feeding shaft 110, through the through-passage 44. The scanner 2 also permits a reading operation in the event of a document moving past, with the reading head 6 being stationary, i.e. in the position in which it is parked beneath the reading window 14. The transporting roller 108 takes over the document at that part which has already been read in and transports the document through the through-passage 44, out of the feeding apparatus 100. As is indicated, the cover 38 forms the deposition location for the read-in documents. The stop 50 counteracts a possible tendency for the repeated take-up of documents into the feeding apparatus and assists deposition in the stack D2.

It should be added that the support for the feeding shaft 110 in the cover part 30 and in the grooves 54 is selected such that said support permits the feeding shaft to be raised up, e.g. during or for raising-up of the cover 38.

Figure 6:
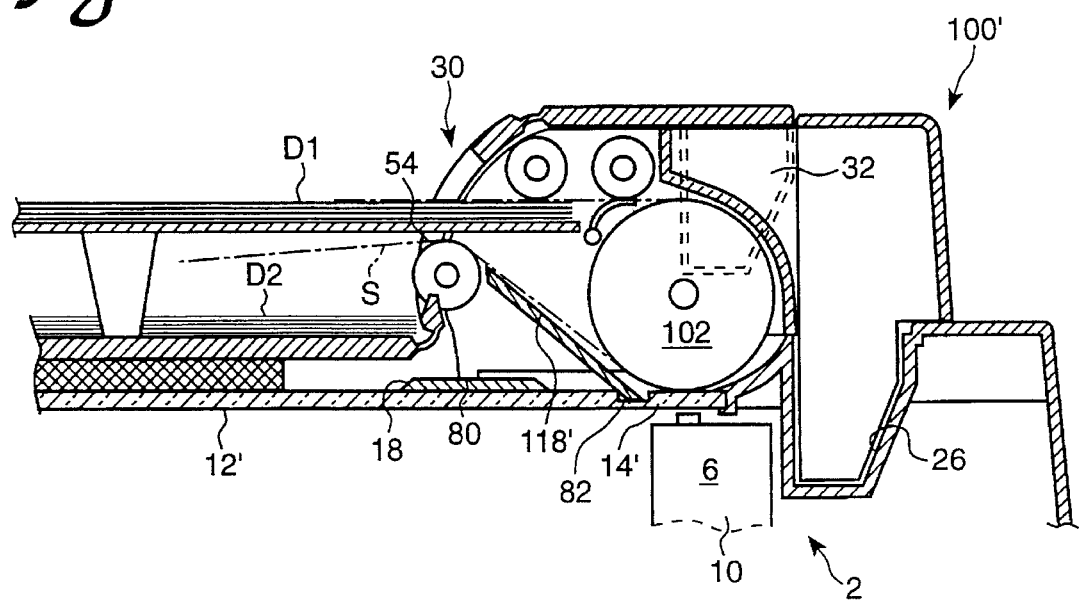
FIG. 6 shows, in a representation corresponding to FIG. 5, a scanner which is of the second exemplary embodiment and is in the converted state.
Figure 7:
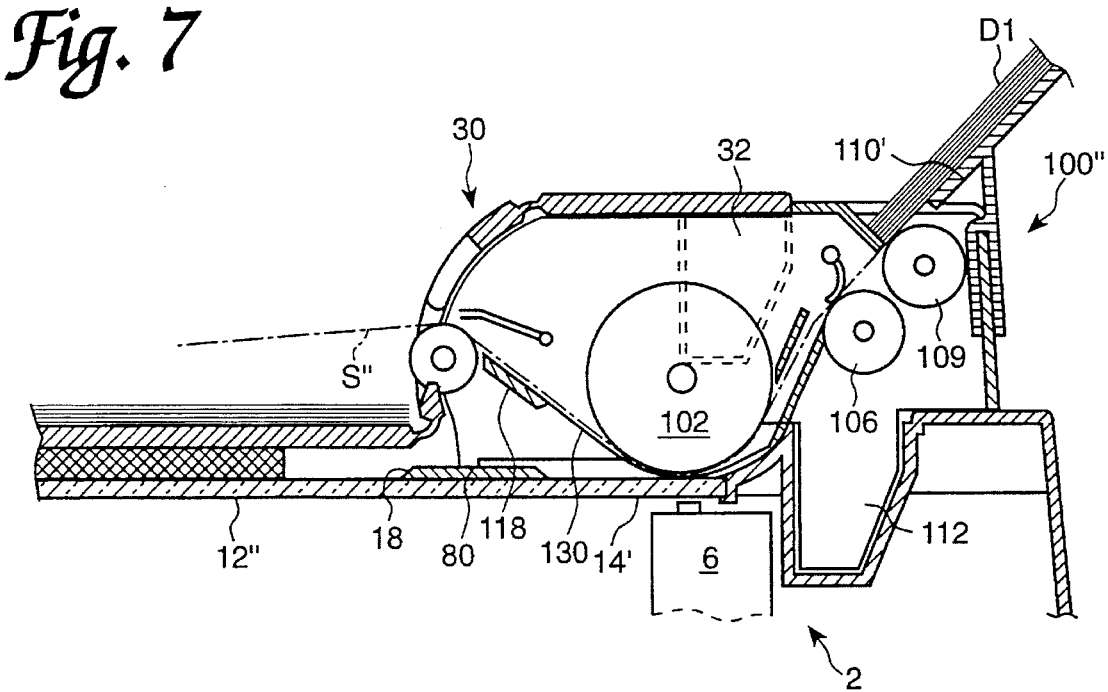
FIG. 7 shows, likewise in a representation according to FIG. 5, a converted scanner of the third exemplary embodiment.

The exemplary embodiments represented in FIGS. 6 and 7 differ from the exemplary embodiment described above only as regards the scanner 2 and the feeding apparatus 100. It can be seen from this that the cover unit 30, of the configuration according to the invention, is suitable for a plurality of different applications.

As can be seen in FIG. 6, the document rest 12' extends over the parked reading head 6, and thus likewise forms the reading window 14. The latter thus does not have to be provided as an individual element. In contrast, there is provided, on the document rest 12' a stop molding 80 which forms the stop 18 and serves for positioning documents which are laid manually in the scanner.

Furthermore, in the vicinity of the parked position 10 of the reading head 6, a groove 82 which runs parallel to the stop molding 80 is provided in the document rest, on the side directed towards the feeding apparatus 100'. When the scanner is in the converted state, there engages into the groove 82 a deflection molding 118' which is fastened rigidly in the feeding apparatus and replaces the directing surface 24 of the abovedescribed exemplary embodiment. The engagement into the groove 82 ensures that the document emerging beneath the reading roller 102 runs on to the deflection molding 118' and thus has to follow the path S provided. As far as the operation is concerned, the exemplary embodiment according to FIG. 6 does not differ in any way from that according to FIGS. 1–5. The cover unit 30 may be identical with the abovedescribed cover unit 30.

While having the same cover unit and differing slightly as regards the scanner housing, the exemplary embodiment according to FIG. 7 differs from the exemplary embodiment according to FIG. 6 mainly due to the configuration of the feeding apparatus 100". The feeding apparatus 100" is provided, here, with a transparent and flexible guide sheet 130 which extends beneath the reading roller 102. The downwardly inclined document shaft 110" is located, here, on that side of the scanner which is opposite the cover 38 and the deposition location and, accordingly, it does not have to pass through the cover unit 30. However, the transportation via the path S" of the feeding apparatus 100" is effected by the same driven members as are described above. Here too, said members are the drawing-off roller 104, the separation roller 106, the reading roller 102 and, finally, the transportation roller 108, and these are assigned suitable stationary directing members, the guide sheet 130 rendering the groove 82 in the rest 12 superfluous. In the case of this exemplary embodiment too the advantages of the configuration according to the invention are obtained to the full extent when the scanner has been converted by adding the feeding apparatus.

I claim:

1. A scanner having a housing, said scanner being intended for manual document input and being constructed and arranged to be converted for automatic document intake, said scanner having a cover unit comprising a cover, a folding part and a retaining part which is connected releasably to the scanner housing, the folding part connecting the cover to the retaining part in a link-like manner via parallel hinges fitted on both sides of the folding part, wherein the folding part includes an elongate through-passage which extends over the operating width of the scanner and runs parallel to the hinges.

2. The scanner as claimed in claim 1, wherein fastening means are provided on the scanner housing and are intended for the cover unit for fastening a feeding apparatus to the scanner, and wherein fastening means on the feeding apparatus are assigned to fastening means on the retaining part.

3. The scanner as claimed in one of claims 1 or 2, wherein said scanner has a read-in head which assumes a predetermined rest position, and wherein a strip-like reading window is provided laterally offset with respect to a document stop assigned to a transparent document rest, and located on a far side of said stop, said strip-like reading window being arranged above a parking position of the read-in head.

4. A scanner having a housing, said scanner being intended for manual document input and being capable of being converted for automatic document intake, and a feeding apparatus which is used for converting said scanner, said scanner having a cover unit comprising a cover, a folding part and a retaining part which is fastened releasably on the scanner housing, the folding part connecting the cover to the retaining part in a link-like manner via parallel hinges fitted on both sides of the folding part, wherein the folding part includes a through-passage which extends over the operating width of the scanner and runs parallel to the hinges, and wherein the feeding apparatus can be connected to the scanner housing in place of the retaining part and includes means for the releasable fastening of the retaining part, the through-passage in the folding part forming at least a document discharge from the feeding apparatus, and the cover forming the document-deposition location.

5. Scanner as claimed in claim 4, wherein the folding part includes means for supporting a feeding shaft as well as a stop which projects into the through-passage.

6. A scanner which has a housing and a cover, the cover being constructed and arranged to be raised up for the manual input of documents, wherein the cover is connected to the housing via a folding part and a retaining part, the folding part, which is connected both to the cover and to the retaining part via hinges which have parallel hinge pins, the folding port including an elongate through-passage which extends parallel to the hinge pins.

7. The scanner as claimed in claim 6 in combination with a feeding apparatus attached to the scanner.

8. A feeding apparatus for the automatic reading-in of documents in a scanner, the feeding apparatus having a driven reading roller and being constructed and arranged such that document discharge takes place through an end side thereof, wherein said end side is open, said feeding apparatus having means for fastening on the scanner, and the scanner includes a cover unit, wherein means for fastening the cover unit of the scanner are provided on the upper side of the feeding apparatus, and the means for fastening on the scanner correspond to the means for fastening the cover unit, and wherein, in the fastened state the cover unit covers over the open end side, and a folding part having a through-passage provided therein permits document discharge.

* * * * *